June 14, 1960

R. B. HARTMAN II 2,941,066

MODIFIED ARC WELDING SYSTEM

Filed Feb. 27, 1958

INVENTOR.
ROBERT B. HARTMAN II
BY
ATTORNEY

June 14, 1960 R. B. HARTMAN II 2,941,066
MODIFIED ARC WELDING SYSTEM
Filed Feb. 27, 1958 3 Sheets-Sheet 2

INVENTOR.
ROBERT B. HARTMAN II
BY
ATTORNEY

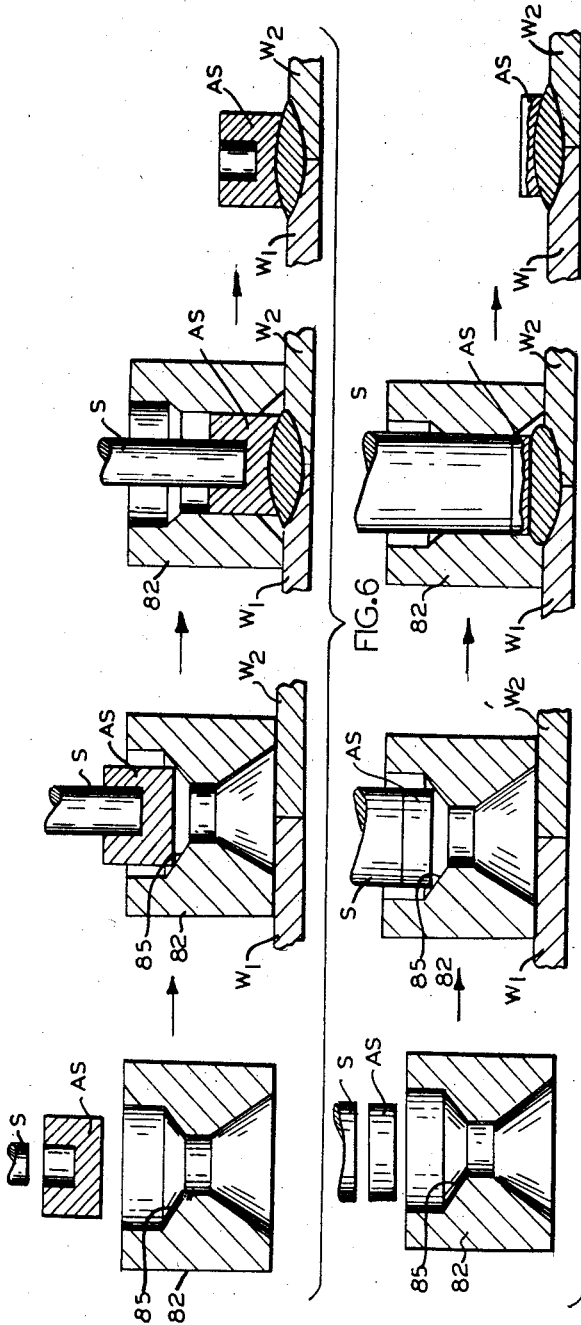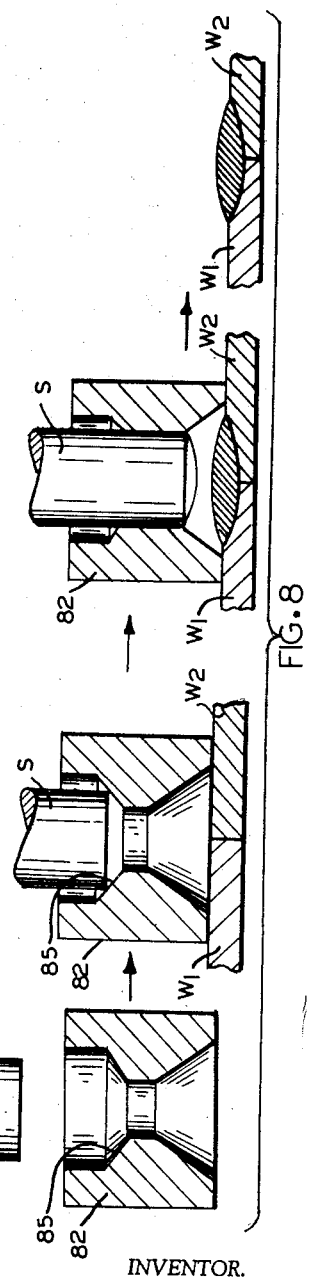
INVENTOR.
ROBERT B. HARTMAN II

United States Patent Office 2,941,066
Patented June 14, 1960

2,941,066

MODIFIED ARC WELDING SYSTEM

Robert B. Hartman II, Bridgeport, Conn., assignor to Remington Arms Company, Inc., Bridgeport, Conn., a corporation of Delaware Filed Feb. 27, 1958, Ser. No. 718,010

2 Claims. (Cl. 219—99)

My invention lies in the field of electric arc welding and is principally concerned with specialized portions thereof known as tack welding and plug welding. The term tack welding as used herein means the temporary bonding of two metallic workpieces together, for example as in setting up steel reinforcing members for concrete structures prior to the pouring operation. Other applications are known to those skilled in the art. By plug welding is meant the welding of a thin metallic sheet to a heavier base member.

More particularly my invention involves modifying a known system of arc welding used primarily for welding studs to workpieces. The known stud welding process is one in which a slag-forming or flux-forming fusible solid body having a passageway therethrough is placed on a workpiece, a second workpiece or stud is inserted in the passageway against a stop shoulder spaced from the other end of the passageway and the workpiece surface. The stud is firmly held against the stop shoulder in the slag-forming body by means urging the stud toward the workpiece. Electric current is passed through the workpiece, slag-forming body and stud to initiate an arc between the stud and workpiece in the passageway through the slag-forming body. When the heat of the arc has deteriorated the stop shoulder in the passageway, the softened stud end is brought into contact with the partly molten workpiece, by the means urging them together, to form the weld. The current is shut off shortly thereafter.

Issued Patents 2,510,000, dated May 30, 1950, 2,509,999, dated May 30, 1950, 2,587,251, dated February 26, 1952, 2,643,319, dated June 23, 1953 and 2,755,164, dated July 17, 1956, all in the name of Van Der Willigen disclose the process with which the present invention is involved.

Ordinarily some form of tool or means is provided for holding the stud and slag-forming element in position, for applying the force to thrust the stud and workpiece into contact with each other when the intervening slag-forming element gives way, and for supplying the current needed at the necessary voltage to initiate the arc and heat the workpieces. The tool disclosed to illustrate my invention is fully described in my copending application for Letters Patent filed February 26, 1958, Serial No. 717,634.

The principal object of the present invention is the provision of an improved arc welding system which will be capable of carrying out the somewhat specialized plug and tack welding operations in a rapid and efficient manner.

Other objects will appear from the following description and the appended claims.

I attain the above object by means and methods preferred forms of which are illustrated in the accompanying drawings in which:

Figure 6 is a sequence of views illustrating a plug or tack welding cycle showing the arrangement of parts at varying stages in the cycle.

Figure 7 is a sequence of views illustrating a modified form of a plug or tack welding cycle showing the arrangement of parts at varying stages in the cycle.

Figure 8 is a sequence of views illustrating yet another form of a plug or tack welding cycle showing the arrangement of parts at varying stages in the cycle.

I will first describe the basic electric arc stud welding system of which the present invention is a modification. This systems calls for a stud to be positioned adjacent to a workpiece in the desired fastening location, application of a sufficient voltage across the stud and workpiece to initiate an arc between them, and after a definite period of time in which the end of the stud and the impact area on the workpiece are heated by the current to a somewhat molten state, sharply forcing the end of the stud into the impact area on the workpiece to form the weld joint at which time the electric current is cut off.

More specifically the present invention relates to a known form of this process as disclosed in the above mentioned patents to Van Der Willigen, in which the time period, during which the arc and current are maintained, is controlled by a fusible flux-forming or slag-forming element T with a passage therethrough positioned between the stud S and the workpiece W. As indicated in the referenced patents this slag-forming or timer element T is capable of conducting electrical current in at least one direction and also by means of a passageway therethrough with an abutment, is capable of supporting the stud S which is backed up by spring means forcing the stud S against the timer T and toward the workpiece. The relative position of these elements are disclosed in Figures 2, 3, 4 and 5.

Upon application of the voltage across the stud S, timer element T and workpiece W, a current is first conducted through the slag-forming timer element T and later directly between the stud S and workpiece W, in the form of an arc which is set up in the central passageway in the timer element T. The arc accomplishes two things principally; the first is the softening or partial melting of the end of the stud nearest the workpiece and also of the impact area on the workpiece; the second is the deterioration or fusing of the flux-forming timer T to the point where it can no longer prevent the spring-urged stud from moving into contact with the impact area on the workpiece. The impact of the softened end of the stud S into the softened impact area on the workpiece W results in the fusing of the stud to the workpiece forming the weld. Simultaneously with stud movement, or shortly thereafter, the current is shut off to complete the cycle of operation.

The term workpiece referred to herein means any metallic surface or member to which it is desired to attach a stud or fastener pin.

The studs or fasteners are metallic and may be in any desired form, the most usual being elongated and cylindrical and at times threaded at one end.

The tool by which the process is carried out generally consists of a chuck or holding device for one end of the stud, means for forcing the stud toward the workpiece means for allowing support and manipulation by an operator and the necessary circuit means to apply the voltage and supply the current required to carry out the welding cycle.

Figure 1:
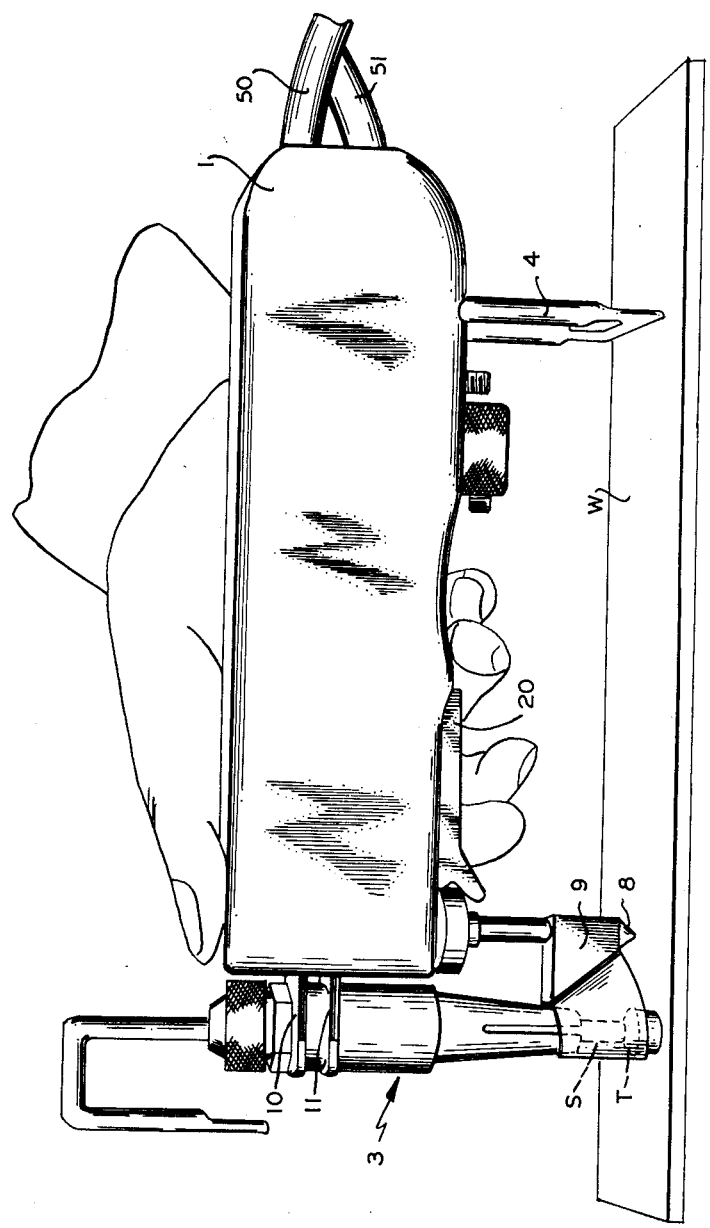
Figure 1 is a general perspective side view of a stud welding tool of the type used with the system embodying the present invention.
Figure 2:
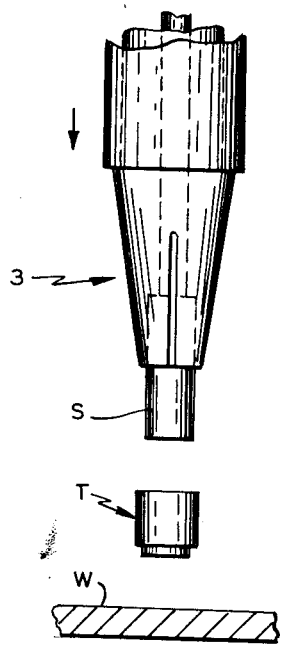
Figure 2 is a partial enlarged side view of the tool chuck assembly of the tool of Figure 1, holding a stud therein, a slag-forming element, and a workpiece, to show the relationship before assembly for carrying out the basic stud welding process.
Figure 3:
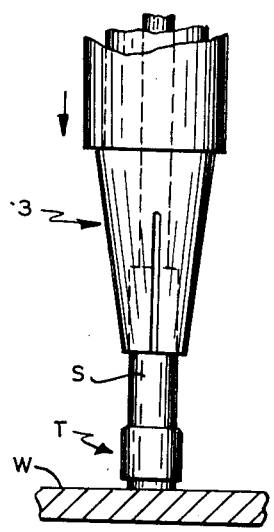
Figure 3 is a partial enlarged side view of the tool chuck of Figure 2 holding a stud which is engaged with the slag-forming element and held in operative position against the workpiece, illustrating the basic stud welding process.
Figure 4:
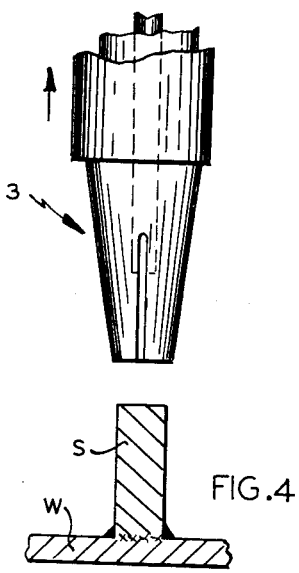
Figure 4 is a partial enlarged side view of the tool chuck assembly of Figure 3 withdrawn from the stud which is shown in welded position on the workpiece, stud and workpiece shown in section, illustrating the final portion of the basic stud welding process.

The details of the tool are not important to the present invention, the construction of certain of these tools being known. The particular tool shown in Figure 1 is fully described in the copending Hartman application for patent Serial No. 717,634 filed February 26, 1958.

Discussing the tool briefly, it consists of a housing 1 of insulating material, a chuck means 3 mounted on leaf springs 10 and 11 which extend through the opening 9 in the end of the housing 1. Workpiece engaging portions 4 and 8 are provided on the tool. A trigger or manual control element 20 is pivotally mounted in the housing 1. Usually the trigger element 20 in a control circuit 51 actuates a remote relay in the main power circuit 50 to carry out the welding cycle. The element 9 is a flash shield for protection of the operator's hand.

Figure 5:
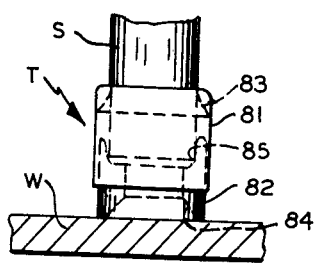
Figure 5 is a partial enlarged side view of the stud and slag-forming element of the basic stud welding process, shown in operative engagement with each other and the workpiece.

The slag-forming or flux-forming timer element T, hereinafter referred to as the timer element is an important unit in carrying out the welding process and is the item with which the present invention is most directly concerned. An enlarged showing of the timer element in cooperative association with the end of a stud is shown in Figure 5. Other views are illustrated in Figures 6, 7, 10 and 11.

The main component of the timer element is the solid refractory material portion 82 of conductive or semi-conductive composition. Examples of this composition are known and are fully disclosed in the referenced patents to Van Der Willigen. The refractory material portion 82 is provided with a central passageway 84 therethrough. In the passageway is formed a supporting shoulder or abutment 85 for receiving and supporting one end of a stud S. A paper or cardboard collar 81 is secured to the exterior of the refractory material portion 82. The extremity of the collar 81 being folded inwardly through an angle of about 180 degrees forms a frictional securing means 83 for the end of a stud.

Turning now to the modified welding system embodying the present invention, Figures 6, 7, and 8 illustrate versions of the improved system.

Referring to Figure 6, this version of my improved system calls for a three piece assembly comprising a foreshortened, counter-bored auxiliary stud AS which is fitted over a smaller retrievable stud S which may be of the ordinary type which is mounted in the chuck assembly 3 of the tool. The stud S may preferably be secured to auxiliary stud AS by frictional engagement or other suitable means. The stud S is secured to the slag-forming element 82 by suitable means such as the paper collar arrangement shown in Figure 5.

Upon actuation of trigger element 20 of the tool welding current is applied and the auxiliary stud AS is welded to both work pieces to tack them together, or for plug welding, provides enough weld metal to fuse a thin sheet workpiece to a heavier workpiece underlying it. The retrievable stud is withdrawn and any remnants of the slag-forming element are knocked or brushed away.

Figure 7 illustrates a modified version of the system of Figure 6 in that a flat disc AS is used as the foreshortened stud. The disc AS is of sufficient thickness to prevent molten metal from welding the disc to the retrievable stud S. The welding takes place as outlined in the above discussion of Figure 6.

The version of the modified basic process shown in Figure 8 illustrates the use of a conventional stud S held in the tool chuck assembly 3 in a position so that in the extreme limit of its spring urged motion toward the workpieces it is spaced a small distance from the workpiece surface by stop means in the tool. As shown in Figure 8, during the welding period, molten material from the stud is deposited on the base metal or workpieces thus providing, in addition to the melted portion of the workpieces, added filler, but at the end of the welding cycle when the stud is moved toward the workpiece it will not pass through the small distance spacing it from the workpiece surface because of its inserted position in the chuck assembly, which prevents the stud end from itself being welded to the workpieces. The same stud may be used for successive welds, simply by advancing the stud in the chuck assembly between welds.

In compliance with the patent statutes, I have illustrated and described preferred forms of embodiment of my invention, but it is to be understood that various modifications and changes could be made therefrom without departing from the spirit of the invention or the scope of the appended claims.

I claim:

1. A unitary stud assembly for use in arc welding two metallic workpieces together, said assembly comprising a primary stud element, a distinct separate secondary fusible stud element aligned therewith in abutting relationship, a solid fusible conductive slag-forming body for initiating and timing the arc and having as passageway therethrough, said slag-forming body cooperating with said separate secondary stud element and secured to said primary stud element with said two separate stud elements in abutment and axial alignment with said passageway so as to position said separate secondary fusible stud element between said primary stud element and said slag-forming element.

2. A stud assembly for use in joining two metallic workpieces by arc welding comprising in combination a reusable primary stud, a separate expendable fusible secondary stud in alignment therewith and positioned in abutting relationship thereto, a solid fusible slag-forming body electrically conductive to initiate and control duration of the arc and having a passageway therethrough, said passageway provided with abutment means projecting into said passageway, one end of said primary stud and the said separate secondary stud slidably received in one end of said passageway and engaged with said abutment, the slag-forming body structure surrounding the other end of said passageway adapted to engage the workpiece surfaces.

References Cited in the file of this patent

UNITED STATES PATENTS

| 2,051,284 | Ball | Aug. 18, 1936 |
| 2,477,765 | Nelson | Aug. 2, 1949 |
| 2,509,999 | Willigen et al. | May 30, 1950 |
| 2,510,000 | Willigen et al. | May 30, 1950 |
| 2,584,491 | Nelson | Feb. 5, 1952 |
| 2,761,955 | Sholle | Sept. 4, 1956 |
| 2,829,234 | Blink | Apr. 1, 1958 |
| 2,833,914 | Blink et al. | May 6, 1958 |

FOREIGN PATENTS

| 167,251 | Australia | Mar. 15, 1956 |
| 762,252 | Great Britain | Mar. 28, 1956 |